(12) United States Patent
Lahman et al.

(10) Patent No.: US 9,700,013 B2
(45) Date of Patent: Jul. 11, 2017

(54) BULK FEED STORAGE AND AUGER BIN

(71) Applicants: James Bradley Lahman, Atoka, OK (US); Clint Dodson, Durant, OK (US)

(72) Inventors: James Bradley Lahman, Atoka, OK (US); Clint Dodson, Durant, OK (US)

( * ) Notice: Subject to any disclaimer, the term of this patent is extended or adjusted under 35 U.S.C. 154(b) by 111 days.

(21) Appl. No.: 14/545,817

(22) Filed: Jun. 23, 2015

(65) Prior Publication Data

US 2016/0374311 A1 Dec. 29, 2016

(51) Int. Cl.
*A01K 61/02* (2006.01)
*A01K 5/00* (2006.01)

(52) U.S. Cl.
CPC .................... *A01K 5/001* (2013.01)

(58) Field of Classification Search
CPC . A01K 5/001; A01K 5/00; A01K 5/02; A01K 5/004; A01K 5/005; A01K 5/007; A01K 5/002
USPC ... 119/57.1, 52.1, 52.4, 53, 56.1, 56.2, 57.5, 119/57.91, 57.92
See application file for complete search history.

(56) References Cited

U.S. PATENT DOCUMENTS

| | | | | |
|---|---|---|---|---|
| 988,412 A * | 4/1911 | Valerius | ............. | B01F 15/0251 366/155.2 |
| 2,060,652 A * | 11/1936 | Arnold | ................. | E01C 19/203 239/670 |
| 3,065,808 A * | 11/1962 | Dodgen | ................. | G01G 19/08 119/57.7 |
| 3,238,865 A * | 3/1966 | Mast | ...................... | B30B 11/26 100/216 |
| 3,265,227 A * | 8/1966 | Vratil | ........................ | B60P 1/40 119/57.6 |
| 3,322,429 A * | 5/1967 | Cervelli | .................... | B60P 1/42 198/641 |
| 3,528,588 A * | 9/1970 | Moore | ................... | A01K 61/02 119/51.04 |
| 3,598,087 A * | 8/1971 | Ramser | ............. | A01K 39/0125 119/51.11 |
| 4,071,226 A * | 1/1978 | Miller | .................. | A01C 15/003 366/35 |
| 4,095,705 A * | 6/1978 | Hood | ..................... | B65G 65/46 198/532 |
| 4,144,655 A | 3/1979 | Harris | | |
| 4,234,109 A * | 11/1980 | Goodhart | ................. | B60P 1/42 222/609 |
| 4,330,091 A * | 5/1982 | Rozeboom | ............. | A01D 90/12 241/101.76 |
| 4,480,927 A * | 11/1984 | Peat | ....................... | A01K 5/002 366/299 |
| 4,672,917 A * | 6/1987 | Fox | ..................... | A01K 5/0275 119/56.1 |

(Continued)

*Primary Examiner* — Tien Dinh
*Assistant Examiner* — Ebony Evans
(74) *Attorney, Agent, or Firm* — Randal Homburg

(57) ABSTRACT

A feed bin with a lateral discharging auger chute is used for the deliver of a bulk particulate feed, the bin including a hopper in which feed is held defining a lower taper floor forming a lower opening which directs the contents by a horizontal auger positioned within the lower opening into a horizontal chute where the particulate feed is dispensed. The feed bin with an auger is a component part of an overall system for the deliver and exchange of bulk feed through storage and exchange bins for the convenience and used by ranchers and bulk feed distributors.

4 Claims, 5 Drawing Sheets

(56) References Cited

U.S. PATENT DOCUMENTS

| | | | | |
|---|---|---|---|---|
| 4,700,895 A | * | 10/1987 | Takata | A01C 7/16 |
| | | | | 239/664 |
| 5,129,164 A | | 7/1992 | Painter | |
| 5,184,754 A | * | 2/1993 | Hansen | G01G 13/248 |
| | | | | 177/50 |
| 5,524,796 A | * | 6/1996 | Hyer | B65G 33/18 |
| | | | | 198/662 |
| 6,123,276 A | * | 9/2000 | Ungerer | A01C 19/00 |
| | | | | 239/675 |
| D435,706 S | | 12/2000 | Clark | |
| 6,263,833 B1 | * | 7/2001 | Runyan | A01K 5/001 |
| | | | | 119/51.11 |
| 6,408,787 B1 | | 6/2002 | Clark | |
| 6,422,490 B1 | * | 7/2002 | Truan | A01C 15/18 |
| | | | | 239/659 |
| 6,631,695 B2 | * | 10/2003 | Shin | A01K 5/0266 |
| | | | | 119/57.4 |
| 6,923,393 B1 | * | 8/2005 | Neier | A01K 5/002 |
| | | | | 241/260.1 |
| 7,540,436 B2 | * | 6/2009 | Truan | A01C 15/006 |
| | | | | 222/161 |
| 9,420,759 B2 | * | 8/2016 | Aton | A01K 5/0258 |
| 2007/0297284 A1 | * | 12/2007 | Neier | A01K 5/002 |
| | | | | 366/299 |

\* cited by examiner

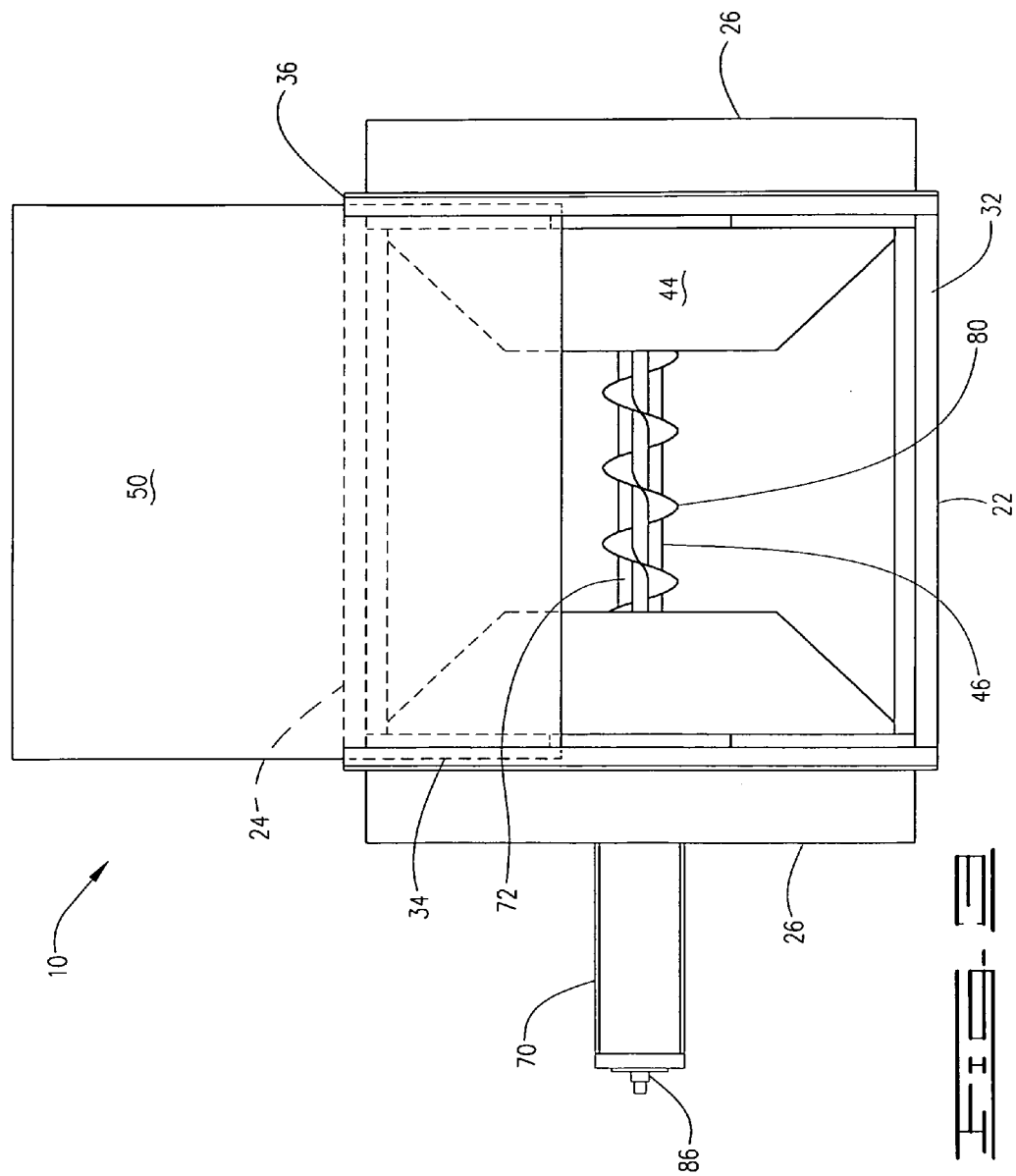

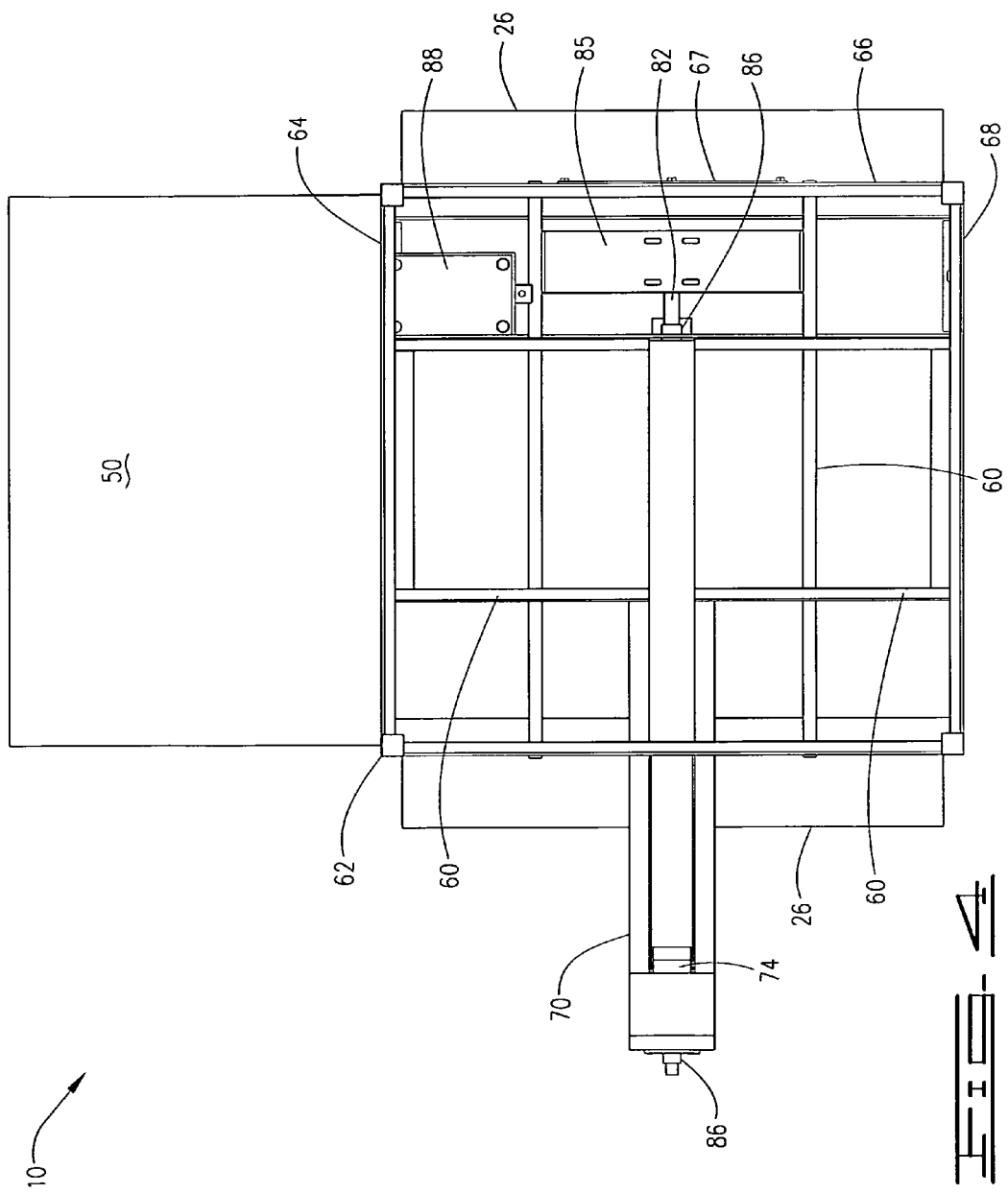

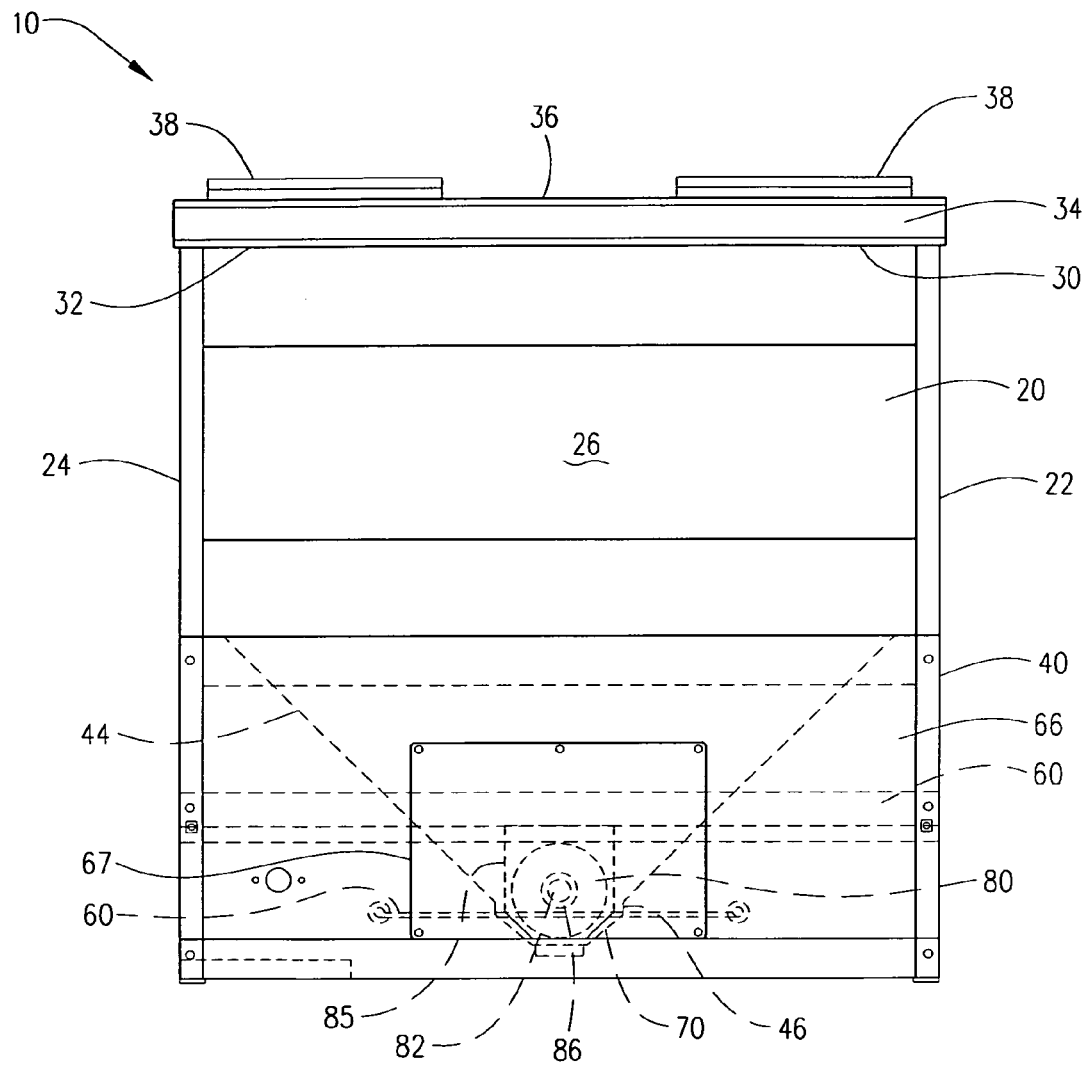

BULK FEED STORAGE AND AUGER BIN

CROSS REFERENCE TO RELATED APPLICATIONS

None.

I. BACKGROUND OF THE INVENTION

1. Field of Invention

A feed bin with a lateral discharging auger chute is used for the deliver of a bulk particulate feed, the bin including a hopper in which feed is held defining a lower taper floor forming a lower opening which directs the contents by a horizontal auger positioned within the lower opening into a horizontal chute where the particulate feed is dispensed. The feed bin with an auger is a component part of an overall system for the deliver and exchange of bulk feed through storage and exchange bins for the convenience and used by ranchers and bulk feed distributors.

2. Description of Prior Art

A preliminary review of prior art patents was conducted by the applicant which reveal prior art patents in a similar field or general purpose. However, the prior art inventions do not disclose the same or similar elements as the present stackable bulk feed storage bins, nor do they present the material components in a manner contemplated or anticipated in the prior art.

Prior art bulk feed devices located for sale or being held under prior art patent do not provide stackable containers nor are they of a profile capable of transport in the bed of a standard pickup. They also do not have the ability to provide a user with other appliances and contemplated with the bin being the only required portable components within a feed distribution system.

In U.S. Pat. No. 6,408,787 to Clark, a feed bin is disclosed having a upper hinged lid, a lower slide plate below a tapered bin and an inner grate assembly to break up clumps in the feed product. It is intended for use suspended from a corral fence by a rear clip or wall of a horse trailer. It is not intended for use in a stacked or multiple unit assembly. Clark is also provided in a design patent, issued under U.S. patent Ser. No. 435,706.

In U.S. Pat. No. 6,263,833 to Runyon, a pickup bed mounted feed distribution device presents an elongated box or hopper with a tapered bottom bin supplying a lower side distribution auger with a granular content for distribution into fee troughs. The Runyon bin comprises an upper lid which is opened for the introduction of feed into the bin, a lower frame supporting the bin bottom and auger above the bed of the pickup, and a side chute which is hinged to be folded up for transport and down during auger active distribution of the feed content. It is a single stack apparatus and is transported on a flat be trailer or pickup, being attached to and integrated upon the transport vehicle.

II. SUMMARY OF THE INVENTION

The livestock industry relies upon particulate feed for food supplements for livestock and other animals. This particulate feed comes in two forms—bagged feed and bulk feed. Bagged feed is generally transported by trucks and comes stacked upon pallets or is sold in individual bags of feed. Bulk feed is delivered by truck or rail and is loaded either into a truck bed after purchase by a front end loader or is dispensed in a container by a hopper. A purchaser is most often required to pick up their bulk feed from a local feed store and either haul it with their own equipment or rent and/or borrow a transport vehicle to haul it to their location for storage and subsequent use.

The prior art demonstrates special trailers which are provided to haul and store bulk particulate feed—some of them even having built-in dispensaries to off-load the contained feed. When these devices are empty, the user simply takes them back for a refill of feed or use another means to deliver replacement feed for a next feeding.

It would be the intent of the present invention to provide the present storage bin with an auger for use independently or with stackable bulk feed storage, transport and exchange bins as disclosed in the application by the same inventors filed contemporaneously with the present application a companion vessel use for particulate bulk feed handling. Each auger bin has an upper sliding lid within which the bulk feed materials are delivered to fill the bin with a chosen feed. The bin has a storage cavity defining a tapered feed hopper floor which directs the feed materials into a lower chute opening over which an auger is placed to move the contents along a horizontal plane into the chute where it is evacuated through a lateral chute opening. Each bin is filled with bulk feed at a bulk feed merchant, transported by the purchaser and stored until the feed is distributed through the chute to a trough or livestock feeder. The auger bin may then be refilled by a bulk feed storage and exchange bin, which is stacked above the auger bin or held over it during refill of the auger bin, or it is transported back to the bulk feed merchant for refilling or for exchange with another auger bin. Each bin is of a dimension to be transported in the bed of a pickup.

III. DESCRIPTION OF THE DRAWINGS

The following drawings are submitted with this utility patent application.

FIG. 3 is a top view of the bulk feed storage and auger bin with the lid removed to expose the a portion of the auger between the lower rectangular chute and the upper chute opening.

FIG. 4 is a bottom view of the bulk feed storage and auger bin.

FIG. 5 is a rear end view of the bulk feed storage and auger bin, with broken line indicating the internal configuration of the bin, including the lower tapered floor and the lower rectangular chute, the auger and its bearings and a rear access plate over the direct drive mechanism.

IV. DESCRIPTION OF THE PREFERRED EMBODIMENT

Figure 1:
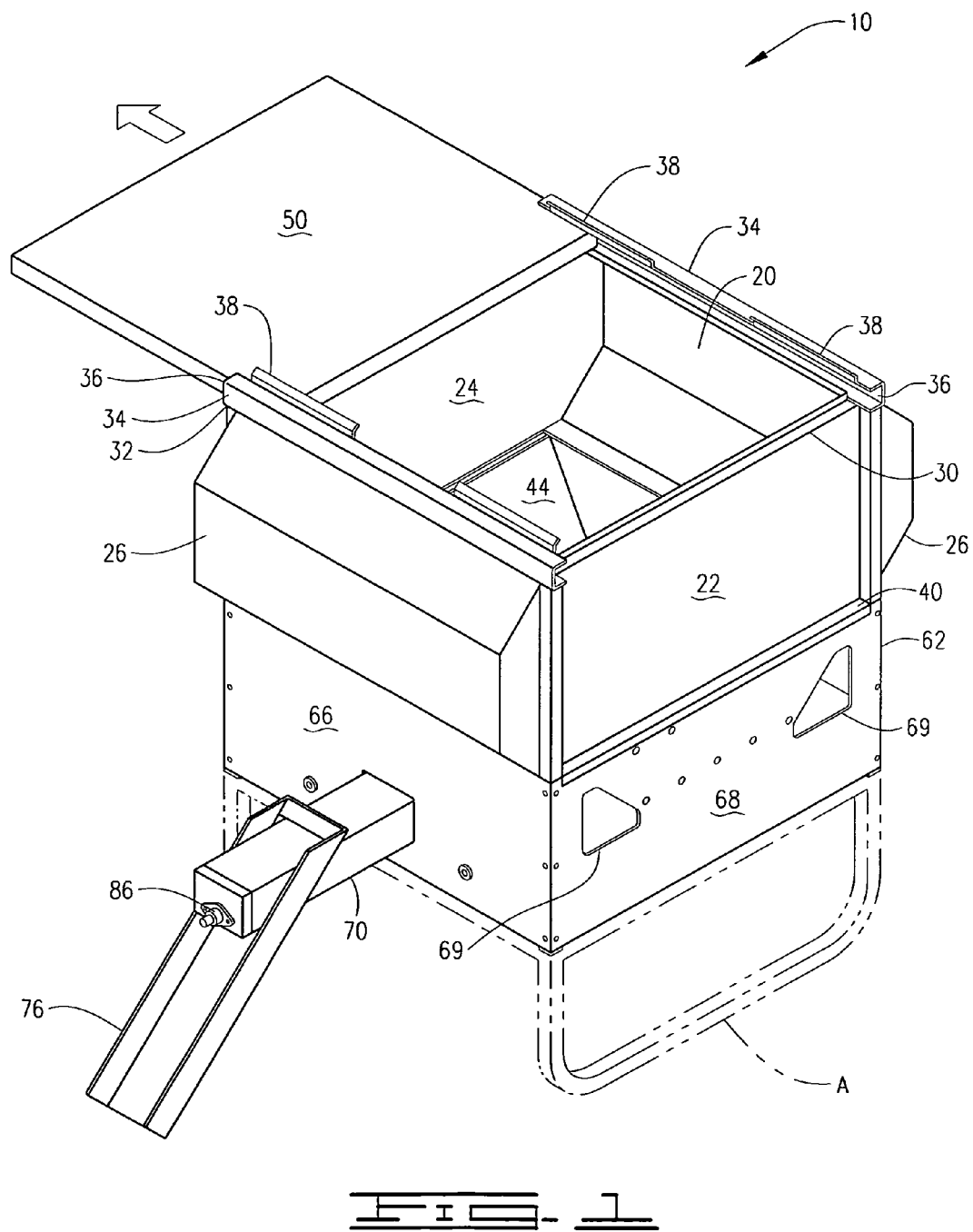
FIG. 1 is a front perspective view of a bulk feed storage and auger bin, with phantom lines showing a lower base support supporting the bin.
Figure 2:
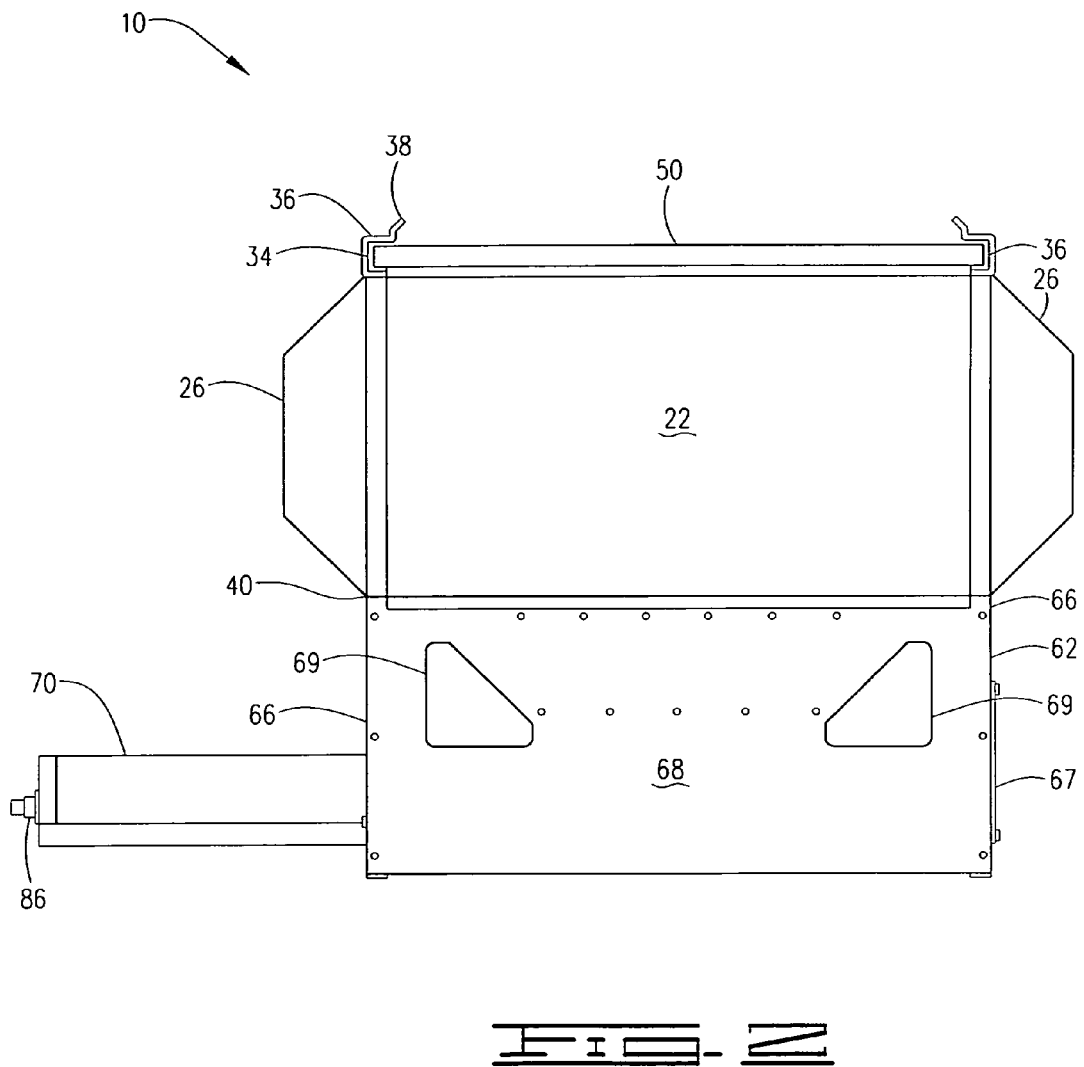
FIG. 2 is a side view of the bulk feed storage and auger bin with phantom lines indicating a lower base support supporting the bin.

A bulk feed storage and auger bin 10, shown in FIGS. 1-5 of the drawings, for the bulk handling and dispensing of a particulate feed for livestock or other particulate bulk material, the bin 10 defining a rectangular feed hopper 20 defining a front panel 22, a back panel 24 and two expanded lateral side panels 26 attaching to one another, an upper rim 30 defined by the upper edge 32 of the rectangular feed hopper 20, the upper rim 30 extending upper lid slide rails 34 above each lateral side panel 26 defining facing lateral lid slide channels 36 and an upper contoured support extension 38, a lid 50 sliding horizontally engaged within the facing lid slide channels 36, a lower edge 40 of the hopper 20 attaching to a lower tapered floor 44 forming a lower rectangular chute 46, FIG. 3. The expanded lateral side panels 26 may be expanded outward, as shown in the drawing figures for expanded capacity of the hopper, FIGS. 1-2. The hopper 20 is mounted upon a support frame 60 within a lower support stand 62, the lower support stand 62 defining rear panel 64, two side panels 66, and a front panel 68 through which a pair of parallel fork slots 69 are positioned providing entry underneath the support frame 60 of the lower support stand 62. The sliding lid 50 engages within the lid slide channels 36, the lid 50 sliding from front to back to provide access to the hopper 20 for filling with the particulate feed.

Within the lower support stand 62 is an enclosed horizontal chute 70, FIGS. 1-4, attached below the tapered floor 44, the horizontal chute 70 defining an upper chute opening 72 receiving the contents from the lower rectangular chute 46 of the hopper 20 by the rotation of a horizontally mounted auger 80, FIG. 3, rotatably elevated above the lower rectangular chute 46 by at least two auger bearings 86, FIGS. 1 and 5, the auger 80 providing rotational movement of the particulate feed within the hopper 20 into the upper chute opening 72 of the enclosed horizontal chute, further urging the particulate feed within the horizontal chute 70 to an external lateral chute opening 74, where the particulate feed is evacuated from the chute 70, FIG. 4.

The delivery location may be a bucket, trough or other field feeding device where the bulk particulate feed is normally delivered to livestock. A direct drive mechanism 85 is located within the support stand 60 at a drive end 82 of the auger 80, which is set behind a drive access door 67 within one side panel 66 in the event access is required for maintenance or repair, FIG. 5, the drive end 82 of the auger 80 being driven by the direct drive mechanism 85 further providing rotation to the auger 80 to direct the particulate feed into the upper chute opening 72 through the horizontal chute 70 to the lateral chute opening 74. The direct drive mechanism 85 derives it's power either locally by on-board fuel, such as a small gasoline engine powering the direct drive mechanism, a battery 88 or an on-board electrical power supply, FIG. 4, or the direct drive mechanism can be connected to a power supply on a transport vehicle, which would include low voltage electrical, hydraulic or integrated drive means. The horizontal chute 70 may provide an accessory diversion means 76 to further direct the particulate feed, FIG. 1.

The exchange format use of the auger bin 10 is as a component used with the bulk feed storage and exchange bins, which is systemically similar to a portable propane tank exchange, where a consumer exchanges their empty tank for a full tank repeatedly as opposed to having to wait for the tank to be filled during business hours by an operator or for someone to come to the location to fill the tank. As part of the system involving the bulk storage and transport bins, the auger bin would be kept by a farmer or rancher, either as a rental or a purchased unit suited for their needs and their transportation resources, with the stackable bulk storage and transportation bins being part of the exchange system, each bin having the capacity to be stacked above the auger bin during refilling or during operation, the stacked upper bin being used for storage while the auger bin is used for delivery of feed. The auger bins can also be delivered by the feed merchant to the rancher or consumer with multiple feed bins on a trailer, delivering full bins and retrieving empty ones on a subscription route.

The auger bins 10 are also designed for inclusion within other systems which can be provided as integrated vehicle or implement transport systems or simply used independently, the fork slots 69 providing access for lift and movement by skid steering equipment, loading tractors with hay forks, or a fork lift implement either at the farm and ranch location or at the distributor. The auger bins 10 may be utilized as a stationary base unit in a permanent location placed upon a lower base support A, with exchange bins being used for perpetual particulate feed replenishment. The upper sliding lid 50 of the auger bin 10 is independently capable of full opening and closing whether an exchange bin is stacked above it or not. Other uses will be apparent once the full utility of the device is understood by those skilled in the art and the industry.

The primary benefits of having the bulk feed storage and auger bins 10, as disclosed, lies within the ability of a user to purchase, haul and deliver particulate feed in bulk quantities, reducing the handling required in bagged feed, and also providing the storage and auger bin utilized with the bulk feed storage and transport bins in the disclosed profile, which allows for each storage and auger bin and companion bulk feed storage and transport bins to be placed within the bed of a pickup or hauled on a flat bed semi-trailer in the same manner as a palate, which is designed to transport up to 26 storage bins or palates per level, or 52 storage bins in a two-high stacked transport. Another advantage over other storage and auger bins 10 lies within each auger bin have the capability of having a companion bulk storage and transport bin stacked upon the bulk storage auger bin 10 while maintaining the ability to empty the upper bulk storage and transport bin into the lower auger bin by the operation of the sliding lid 50 and the auger 80 while stacked. This enables the user to empty the upper storage and transport bin, and simply replace it without requiring the movement of the bulk storage and auger bin 10 within a stationary or transportable feed distribution system, and then dispense the contents of an upper storage bin 10 into the lower auger bin or other component. The now empty upper bulk transport and storage bin may then be replaced with a newly filled storage bin, with the lower auger bin 10 remaining in place while the upper storage bin is repeatedly refilled or replaced. It is contemplated that the feed auger bin 10, due to its disclosed utility, can be used to move the particulate feed horizontally for delivery into feed troughs or to other mobile devices, or from pickup beds using feed spreaders, feed mixers, uplift devices, or as a replacement accessory on a front end loader.

While the auger bin 10 has been particularly shown and described with reference to a preferred embodiment thereof, it will be understood by those skilled in the art that changes in form and detail may be made therein without departing from the spirit and scope of the invention.

The invention claimed is:

1. A bulk feed storage and auger bin for the bulk handling and dispensing of a particulate feed for livestock or other particulate bulk material, the bin comprising a rectangular feed hopper defining a front panel, a back panel and two expanded lateral side panels attaching to one another, an upper rim formed from an upper edge of said hopper, said upper rim extending a pair of upper lid slide rails above each said lateral side panel defining facing lateral lid slide channels, an upper support extension extending from an upper portion of each of said pair of upper lid slide rails, and a lower tapered floor defining a lower rectangular chute;

a lid sliding horizontally engaged within the lid slide channels;

a support frame within a lower support stand, said lower support stand defining a rear panel, two side panels, and a front panel through which a pair of parallel fork slots are positioned providing entry underneath said support frame of said lower support stand to lift and transport said bin; and an enclosed horizontal chute attached below said tapered floor, said horizontal chute defining an upper chute opening receiving said particulate feed or other particulate bulk material from said lower rectangular chute of said hopper by rotation of a horizontally mounted auger, rotatably elevated above said lower rectangular chute by at least two auger bearings, said auger rotating by a direct drive mechanism mounting within said support frame providing movement of said particulate feed within the hopper down said tapered floor into said upper chute opening of said enclosed horizontal chute, further urging the particulate feed within said horizontal chute to an external lateral chute opening, wherein said particulate feed is evacuated from said chute.

2. The bulk feed storage and auger bin as disclosed in claim 1, further comprising:

said direct drive mechanism is set behind a drive access door within one said side panel in the event access is required for maintenance or repair and said auger further comprises a drive end driven by said direct drive mechanism which derives mechanical power from an on-board fuel source and power supply, said direct drive mechanism including a small gasoline, an on-board electrical power supply, or an external power supply on a transport vehicle, and said power supply including a low voltage electrical, hydraulic or integrated drive means.

3. The bulk feed storage and auger bin as disclosed in claim 1, further comprising said horizontal chute providing an accessory diversion means to further direct the particulate feed away from said horizontal chute.

4. The bulk feed storage and auger bin as disclosed in claim 1, wherein said support extensions extend above said auger bin wherein other bulk storage containers are stacked upon and above said support extensions without impeding said upper lid movement within said slide channels, wherein said bulk feed storage and auger bin is refilled from said other bulk storage containers without requiring said bulk feed storage and auger bin to be transported to a feed supply location and to maintain an additional supply of bulk feed in addition to that supply contained within hopper of said auger bin.

* * * * *